United States Patent [19]

Bergh

[11] 4,373,556

[45] Feb. 15, 1983

[54] CUT-OUT FUSE TUBE

[75] Inventor: Daniel D. Bergh, Lenox, Mass.

[73] Assignee: Canadian General Electric Company Limited, Toronto, Canada

[21] Appl. No.: 326,549

[22] Filed: Dec. 2, 1981

[51] Int. Cl.$^3$ ..................... D03D 35/00; H01H 85/02
[52] U.S. Cl. .................................. 138/140; 138/174;
138/177; 337/158; 337/186; 428/36; 525/438
[58] Field of Search .............. 337/270, 158, 186, 159;
428/36; 138/174, 177, 140; 525/438

[56] References Cited

U.S. PATENT DOCUMENTS

| | | | |
|---|---|---|---|
| 2,976,889 | 3/1961 | Cannady, Jr. | 138/141 |
| 2,991,808 | 7/1961 | Siegmann et al. | 138/141 |
| 3,054,428 | 9/1962 | Crawford | 138/141 |
| 3,435,397 | 3/1969 | Sankey et al. | 337/34 |
| 3,801,947 | 4/1974 | Blewitt et al. | 337/246 |
| 3,846,727 | 11/1974 | Harmon | 337/246 |
| 3,983,525 | 9/1976 | Healey, Jr. | 337/186 |
| 3,986,158 | 10/1976 | Salzer | 337/246 |
| 4,076,767 | 2/1978 | Samejima | 525/438 |
| 4,141,882 | 2/1979 | Kocama et al. | 525/438 |

FOREIGN PATENT DOCUMENTS 645259 7/1962 Canada.

OTHER PUBLICATIONS

ASTM: *Tentative Specifications for Vulcanized Fibre Sheets Rods and Tubes Used for Electrical Insulation,* 1954.
*The Arc-Interruption and Gas-Evolution Characteristics of Common Polymeric Materials*—8th IEEE/PES Conference-Minneapolis, Sep. 20-25, 1981.
GE. Pamphlet—*Current Limiting Fuses on Distribution Systems*—1974.

*Primary Examiner*—William R. Dixon, Jr.
*Attorney, Agent, or Firm*—R. A. Eckersley

[57] ABSTRACT

The present invention concerns the use of polyester materials in arc quenching applications, particularly in the cutout fuse tube industry. In one embodiment of the present invention a fuse tube is disclosed as comprising a laminate two-layered structure including as its inner layer, (or liner), a polyester filament winding supported in a cured cyclo-aliphatic epoxy resin matrix. The outer layer includes wound glass filaments supported within a cured epoxy resin matrix.

13 Claims, 2 Drawing Figures

CUT-OUT FUSE TUBE

FIELD OF THE INVENTION

The present invention relates to the use of cycloaliphatic epoxy-supported polyester materials in arc-quenching applications such as for example, electrical fuse tube manufacture. More particularly, the present invention is concerned with the use of cycloaliphatic epoxy-supported polyester fibre liners in expulsion type fuses such as are used in fuse cut-outs.

Materials having arc-quenching properties suitable for fuse tube applications are known to include, inter alia, reconstituted cellulosic materials (i.e., vulcanized paper fibre and boric acid) and more recently arc extinguishing thermoplastics available from the Dow Chemical Co. (These are molybdenum sulfide filled nylons—see U.S. Pat. No. 3,111,567—V. W. Stewart et al, dated Nov. 19, 1963.

Structural materials known to be useful in the manufacture of fuse tubes include paper, glass cloth, or glass fibre reinforced phenolic resins and epoxy resins, including blends of phenolic resins and glycidyl polyethers or epoxides.

Examples of fuse tubes employing certain of the above-mentioned materials are disclosed in, inter alia, U.S. Pat. No. 3,986,158—Salzer dated Oct. 12, 1976; U.S. Pat. No. 3,846,727—Harmon, dated Nov. 5, 1974; U.S. Pat. No. 3,801,947—Blewitt et al, dated Apr. 2, 1974; and, Canadian Pat. No. 637,266—Cannady, dated Feb. 27, 1962.

The present invention concerns the production of a novel alternative to the above-mentioned arc-quenching materials, one that has particular utility in the manufacture of fuse tubes requiring strong, ablative liner materials. As an alternative to the vulcanized paper fibre commonly employed throughout the fuse tube industry, the material of the present invention offers both reduced cost and improved dimensional stability (owing to an inherently lower tendancy to absorb water) in such fuse tube applications.

SUMMARY OF THE INVENTION

Briefly stated the broadest aspects of the present invention include the provision of a composition, for use in arc-quenching applications, comprising polyester fibre material supported in a cycloaliphatic epoxy resin matrix. The composition may be applied as an arc-quenching surface layer in, for example, fuse tubes.

Additional structural support may be achieved by adding an external layer or layers, of engineering plastics which may include, interalia, epoxy, phenolic, polyurethane or silicone resins. Preferably, such additional layers are reinforced and glass fibre reinforced epoxy is especially preferred for higher voltage fuse tube applications.

In one embodiment of the present invention there is provided a composition comprising polyester fibre supported in a cycloaliphatic epoxy resin matrix.

It will be understood that within the context of the present disclosure, the term "cycloaliphatic epoxy resin" will be taken to mean those polymers resulting from epoxidation of polycyclic aliphatic compounds containing carbon-carbon double bonding. The epoxidation of such multicycloalkenyls may be accomplished via organic peracids, such as for example, peracetic acid.

An example of one such cycloaliphatic epoxy resin which is particularly useful in the practice of the present invention is 3,4-epoxy cyclohexy methyl (3,4 epoxy) cyclohexane carboxylate, the structure of which is shown below:

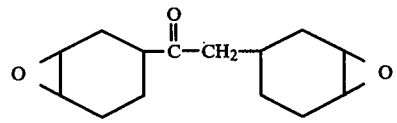

Also, the term "polyester fibre" is used as a generic term meaning any long chain synthetic polymer comprising at least 85 percent by weight of an ester of a dihydric alcohol and terephthalic acid. A typical example of the polyester fibres useful in the practice of the present invention is Dacron ™ fibre, a linear polyester fibre derived from polyethylene terephthalate (the reaction product of two successive ester interchange reactions involving dimethyl terephthalate and ethylene glycol). The repeating unit structure for polyethylene terephthalate is shown below:

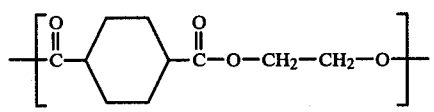

As an alternative to the preferred continuous polyester filaments, it is contemplated that polyester tapes, cloths, or staple fibres may also be employed in the practice of the present invention.

For example in one alternate embodiment of the present invention, staple polyester fibres are embedded in a cycloaliphatic epoxy resin and the resultant composition is pre-formed to the desired shape. In the case of fuse tube manufacturing the formed tube may then be cured, and cut and machined for fuse tube application. Optionally, an additional layer may be applied over the tube after the curing of the first layer of the tube.

Any of the embodiments of the present invention can be further improved by a number of means which effectively enhances the compatability between the polyester fibre and the cycloaliphatic epoxy resin. For example, surface treatments of available industrial polyester fibres (sizings for example) may be selected to optimize bonding between these fibres and the cycloaliphatic epoxy resin.

In this same respect, modification of the cycloaliphatic epoxy resin through the use of flexibilizers and filler is also contemplated.

To further improve the resistance to delamination between the polyester and epoxy materials of the present invention it is also contemplated that multifunctional acids and/or bases could be employed together with certain, known, unsaturated reactants in the manufacture of the polyester fibre material. This would permit chemical cross-linking between the polyester fibre and the thermosetting cycloalipatic epoxy resin.

Flame retardants may also be advantageously employed in the practice of the present invention. It will be noted, however, that the use of certain flame retardants in the polyester fibre-cycloaliphatic epoxy composition may give rise to problems of internal arc over and carbon tracking. Aluminum trihydrate flame retardants minimize these problems, and also provide the additional theoretical advantage that the associated water of hydration may under arc conditions transform any carbon into volatile products.

The incorporation of flame retardants in any additional layers is also desirable. Obviously, the limitations on the selection of flame retardants for such additional layers are not as stringent as for the arc quenching material, however non-halogenated flame retardants are nonetheless preferred.

For a better understanding of the nature and features of the present invention, reference may be made to the following detailed description of the preferred embodiments of the present invention and, in particular, to the examples disclosed hereafter.

DETAILED DESCRIPTION OF THE PREFERRED EMBODIMENTS

Where the practice of the present invention is directed to the manufacture of fuse tubes, it is preferred that such fuse tubes be produced via filament winding techniques such as are well established in the existing art.

Under such a manufacturing regime polyester rovings or filaments are wound onto a rotating mandrel concurrent with the application of an uncured curable cycloalkenyl epoxide to form a first layer which is then cured. This first cured layer is then overwound with a second layer comprising glass roving (having an epoxy compatible sizing) and an additional amount of the same or different uncured cutable cycloalkenyl epoxide.

Optionally, of course, any uncured curable epoxy resin may be employed in place of the additional amount of the cycloalkenyl epoxide, including for example, bisphenol A-epichlorhydrin epoxy resins.

The second, uncured layer of the fuse tube is then cured.

The cured tube is then removed from the mandrel and centerless ground (or otherwise machined) cut to length and painted with a weather resistant paint suitable for fuse tube applications.

The following example will provide a detailed description of one of the compositions falling within the scope of the present invention in any respect.

EXAMPLE

A Dacron ™ yarn (2000 Denier 384 filaments RO2 Type 68) commercially available from Dupont was wet wound onto a rotating mandrel with an uncured Union Carbide 4221 cycloaliphatic epoxy resin and a catalytic curing system which included methyl tetra hydro phthalic anhydride and a catalytic amount of a curing catalyst. This first layer or liner was then cured in an oven at 125° C. for 16 hours and subsequently over wrapped with OCF 462BA Type 30 glass fibres which were also wet wound using the above-mentioned uncured cycloalipatic epoxy resin. The resulting tube was then placed in an oven and the second layer was cured at 125° C. for 16 hours.

The fuse tube was removed from the mandrel, machined, cut to length and painted for use in a fuse cutout.

BRIEF DESCRIPTION OF THE DRAWINGS

The drawings discussed below are illustrative of preferred embodiments of the present invention, wherein;

FIG. 1 shows a fuse tube 10 having a single layered construction and comprising a Dacron ™ polyester filament winding embedded in a cycloaliphatic epoxy resin and further including glass fibre reinforcement which may optionally be staple or continuous filament in form.

FIG. 2 shows a fuse tube 14 having a first layer 12 and a second layer 16. Layer 12 comprises a Dacron ™ polyester embedded in a cycloaliphatic epoxy resin. Layer 16 comprises filament wound glass fibre embedded within bisphenol-A-epichlorhydrin epoxy resin.

Figure 1:
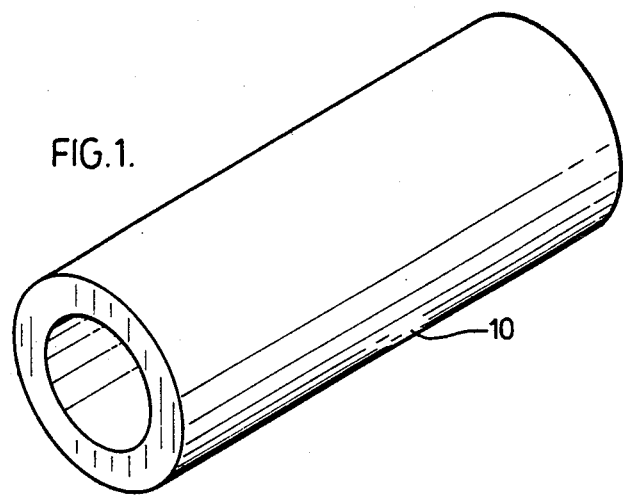
FIG. 1 shows a single layer fuse tube in accordance with the present invention.
Figure 2:
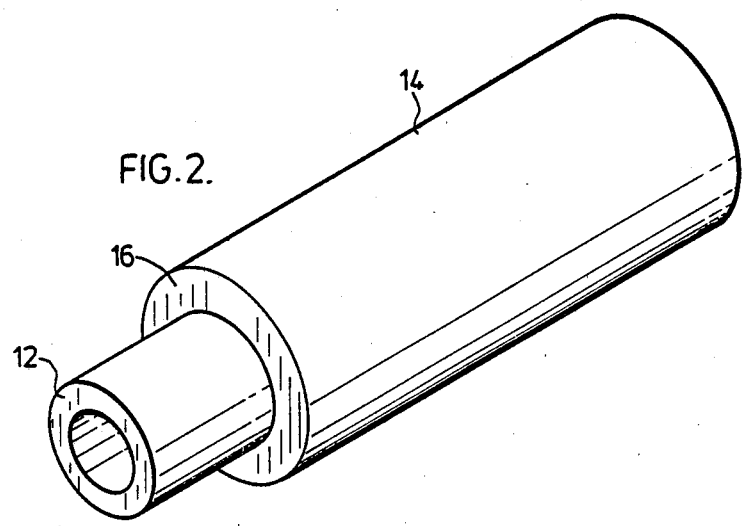
FIG. 2 shows a double layer fuse tube in accordance therewith.

While the foregoing has been a description of preferred embodiments of the present invention, it should be understood that the invention need not be limited thereto. Accordingly, the present invention should be limited only to that which is claimed in the accompanying claims.

What I claim as new and desire to secure by Letters Patent of the United States is:

1. An arc-quenching composition comprising polyester fibre material supported in a cycloaliphatic epoxy resin matrix.

2. The composition of claim 1 wherein said polyester fibre material is a polyester tape.

3. The composition of claim 1 wherein said polyester fibre material is a staple polyester fibre.

4. The composition of claim 1 wherein said polyester fibre material is continuous.

5. The composition of claim 4 wherein said filamentous polyester fibre consists of a long chain synthetic polymer comprising at least 85 percent by weight of said filamentous polyester fibre, of an ester of a dimethyl terephthalate and ethylene glycol, and having repeating units of the formula:

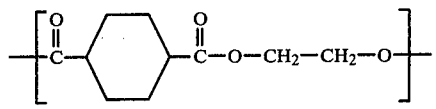

6. A multiple layered laminate having an arc-quenching surface layer comprising a polyester fibre material supported in a cycloaliphatic epoxy resin matrix.

7. The laminate of claim 6 wherein at least one of said multiple layers comprises a glass fibre reinforced bisphenol-A epichlorhydrin epoxy resin.

8. A fuse tube comprising the composition of claim 1.

9. A fuse tube comprising the multiple layered laminate of claim 6.

10. A fuse tube comprising the multiple layered laminate of claim 7.

11. A fuse tube having a multiple layered laminate construction including:
an inner arc-quenching surface layer comprised of a wound filamentous polyester fibre material supported in a cycloaliphatic epoxy resin matrix; and, also including at least one other outer layer of filament wound glass fibre reinforced epoxy resin, said other layer being bonded to said surface layer.

12. The fuse tube of claim 11 wherein said at least one other layer comprises a bisphenol-A epoxy resin.

13. The fuse tube of claim 11 wherein said at least one other layer comprises a cycloaliphatic epoxy resin.

* * * * *